United States Patent
Ahn et al.

(10) Patent No.: US 9,300,447 B2
(45) Date of Patent: Mar. 29, 2016

(54) COMMUNICATION METHOD FOR COOPERATIVE MULTI-POINT AND WIRELESS DEVICE USING SAME

(71) Applicant: LG ELECTRONICS INC., Seoul (KR)

(72) Inventors: Joon Kui Ahn, Anyang-si (KR); Suck Chel Yang, Anyang-si (KR); Han Byul Seo, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 14/342,752

(22) PCT Filed: Oct. 18, 2012

(86) PCT No.: PCT/KR2012/008568
§ 371 (c)(1),
(2) Date: Mar. 4, 2014

(87) PCT Pub. No.: WO2013/058585
PCT Pub. Date: Apr. 25, 2013

(65) Prior Publication Data
US 2014/0219233 A1    Aug. 7, 2014

Related U.S. Application Data

(60) Provisional application No. 61/549,176, filed on Oct. 19, 2011.

(51) Int. Cl.
| | |
|---|---|
| *H04W 72/04* | (2009.01) |
| *H04W 80/04* | (2009.01) |
| *H04L 5/00* | (2006.01) |
| *H04B 7/02* | (2006.01) |

(Continued)

(52) U.S. Cl.
CPC ............... *H04L 5/003* (2013.01); *H04B 7/024* (2013.01); *H04L 27/2601* (2013.01); *H04W 72/1273* (2013.01)

(58) Field of Classification Search
CPC ..... H04W 88/08; H04W 72/04; H04W 80/04; H04W 52/40
See application file for complete search history.

(56) References Cited

U.S. PATENT DOCUMENTS

| | | | |
|---|---|---|---|
| 2010/0034126 A1 | 2/2010 | Kitazoe et al. | |
| 2011/0077038 A1* | 3/2011 | Montojo et al. | 455/507 |
| 2011/0243261 A1* | 10/2011 | Bienas et al. | 375/260 |

(Continued)

FOREIGN PATENT DOCUMENTS

| | | |
|---|---|---|
| KR | 10-2011-0039394 A | 4/2011 |
| KR | 10-2011-0082489 A | 7/2011 |

(Continued)

*Primary Examiner* — Andrew Lee
(74) *Attorney, Agent, or Firm* — Birch, Stewart, Kolasch & Birch, LLP (57) ABSTRACT

Provided are a communication method for a cooperative multi-point and a wireless device using the same. The wireless device receives, from a first cooperative multi-point (CoMP) cell, a first physical downlink shared channel (PDSCH) in a first subframe of a first frequency band, and receives, from a second CoMP cell, a second PDSCH in a second subframe of a second frequency band. A portion or the entire first frequency band is overlapped with the second frequency band. A first start point at which the first PDSCH in said first subframe starts being scheduled is the same as a second start point at which the second PDSCH in said second subframe starts being scheduled.

10 Claims, 6 Drawing Sheets

(51) Int. Cl.
*H04L 27/26* (2006.01)
*H04W 72/12* (2009.01)

(56) References Cited

U.S. PATENT DOCUMENTS

| | | | |
|---|---|---|---|
| 2012/0014349 A1* | 1/2012 | Chung et al. | 370/329 |
| 2012/0051250 A1* | 3/2012 | Sun et al. | 370/252 |
| 2012/0176884 A1* | 7/2012 | Zhang et al. | 370/203 |
| 2012/0195292 A1 | 8/2012 | Ko et al. | |
| 2012/0201194 A1* | 8/2012 | Frankland | 370/328 |
| 2012/0264441 A1* | 10/2012 | Chandrasekhar et al. | 455/450 |
| 2012/0269138 A1 | 10/2012 | Han et al. | |
| 2012/0307779 A1 | 12/2012 | Noh et al. | |
| 2013/0094442 A1* | 4/2013 | Kim et al. | 370/328 |
| 2013/0201841 A1* | 8/2013 | Zhang et al. | 370/252 |
| 2013/0336269 A1* | 12/2013 | Davydov et al. | 370/329 |
| 2014/0105109 A1* | 4/2014 | Zhu et al. | 370/328 |
| 2014/0247767 A1* | 9/2014 | Chen et al. | 370/312 |

FOREIGN PATENT DOCUMENTS

| | | |
|---|---|---|
| KR | 10-2011-0090754 A | 8/2011 |
| KR | 10-2011-0093721 A | 8/2011 |

* cited by examiner

COMMUNICATION METHOD FOR COOPERATIVE MULTI-POINT AND WIRELESS DEVICE USING SAME

CROSS REFERENCE TO RELATED APPLICATIONS

This application is the National Phase of PCT/KR2012/008568 filed on Oct. 18, 2012, which claims priority under 35 U.S.C 119(e) to U.S. Provisional Application No. 61/549,176 filed on Oct. 19, 2011, all of which are hereby expressly incorporated by reference into the present application.

TECHNICAL FIELD

The present invention relates to wireless communication, and more particularly, to a communication method for cooperative multi-point (CoMP) in a wireless communication system, and a wireless device using the method.

BACKGROUND ART $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V8.7.0 (2009-05) "Evolved Universal Terrestrial Radio Access (E-UTRA); Physical Channels and Modulation (Release 8)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

A cooperative multi-point (CoMP) technique is one of techniques introduced in a next-generation mobile communication system. In general, a user equipment receives a service from one cell. The CoMP allows the user equipment to receive a service from two cells geographically separated from each other.

In the 3GPP LTE-A, a plurality of serving cells are provided to the user equipment through carrier aggregation. However, there is no ongoing discussion on uplink transmission and downlink transmission when the carrier aggregation is applied to the CoMP.

DISCLOSURE OF THE INVENTION

The present invention provides a communication method for cooperative multi-point (CoMP), and a wireless device using the method.

There is provided a communication method for cooperative multi-point (CoMP) in a wireless communication system. The method may comprise: receiving a first physical downlink shared channel (PDSCH) in a first subframe of a first frequency band from a first CoMP cell; and receiving a second PDSCH in a second subframe of a second frequency band in a second CoMP cell. The first frequency band may overlap partially or entirely with the second frequency band. A first start point at which the first PDSCH in the first subframe starts to be scheduled may be the same as a second start point at which the second PDSCH in the second subframe starts to be scheduled.

There is also provided a wireless device for supporting cooperative multi-point (CoMP) in a wireless communication system. The wireless device may comprise: a radio frequency (RF) unit for transmitting and receiving a radio signal; and a processor operatively coupled to the RF unit, wherein the processor is configured for: receiving a first physical downlink shared channel (PDSCH) in a first subframe of a first frequency band from a first CoMP cell; and receiving a second PDSCH in a second subframe of a second frequency band in a second CoMP cell. The first frequency band may overlap partially or entirely with the second frequency band. A first start point at which the first PDSCH in the first subframe starts to be scheduled may be the same as a second start point at which the second PDSCH in the second subframe starts to be scheduled.

When carrier aggregation is applied to cooperative multi-point (CoMP) and cells use the same frequency band, inter-cell interference can be mitigated.

MODES FOR CARRYING OUT THE PREFERRED EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
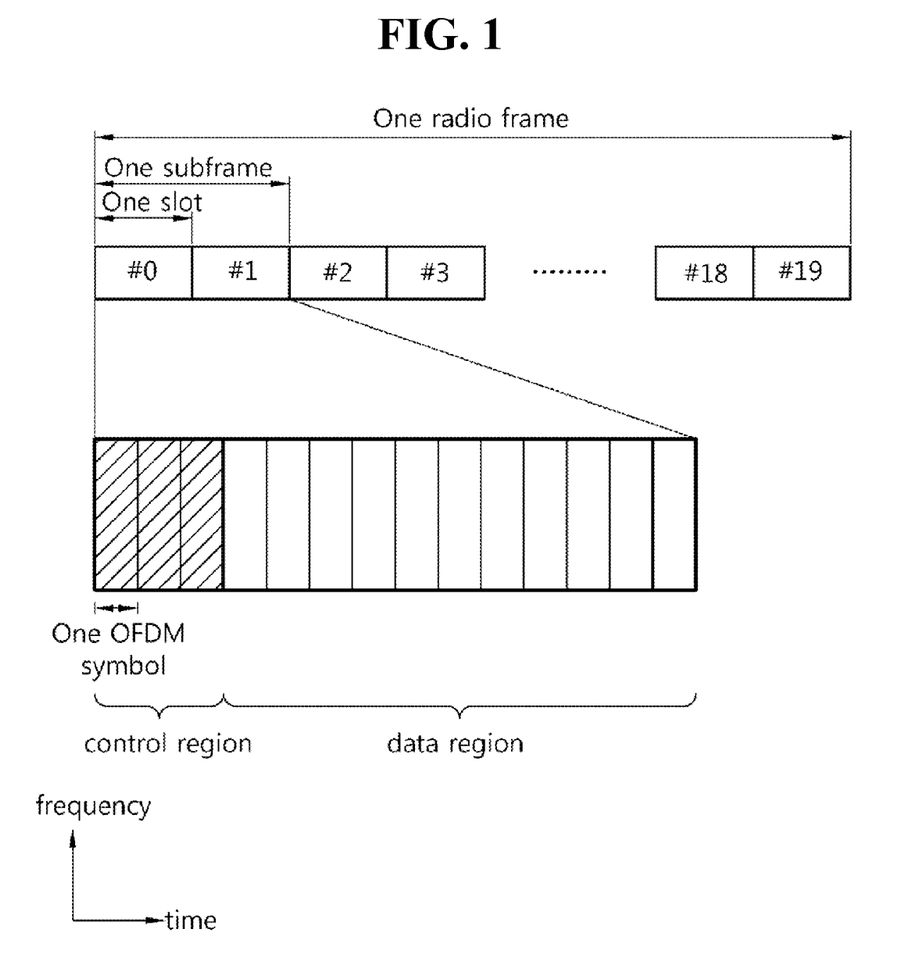
FIG. 1 shows a structure of a downlink radio frame in 3rd generation partnership project (3GPP) long term evolution (LTE).

FIG. 1 shows a structure of a downlink radio frame in 3GPP LTE. The section 6 of 3GPP TS 36.211 V8.7.0 (2009 May) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PDCCH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

According to 3GPP TS 36.211 V8.7.0, the uplink channel includes a PUCCH, a PUCCH, a sounding reference signal (SRS), and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, a multiple-carrier system will be described.

Spectrum aggregation (or bandwidth aggregation, also referred to as carrier aggregation) is that a network supports a plurality of component carriers (CCs). For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through a plurality of CCs, it can be said that the UE receives a service from a plurality of serving cells.

Figure 2:
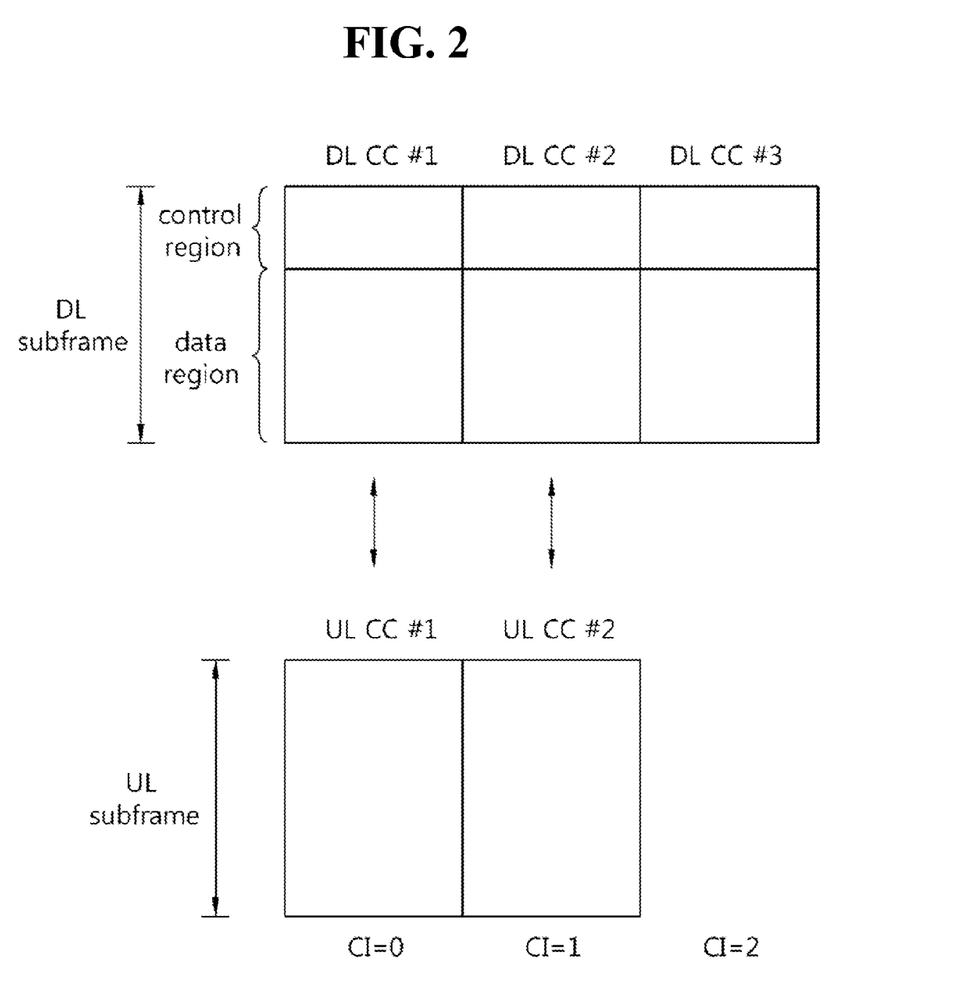
FIG. 2 shows an example of multiple carriers.

FIG. 2 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a wireless device receives a service from three serving cells.

The wireless device can monitor the PDCCH in a plurality of DL CCs, and can receive a DL transport block simultaneously via the plurality of DL CCs. The wireless device can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the wireless device performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource.

At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The wireless device can monitor a PDCCH through a plurality of serving cells. However, even if there are N serving cells, the BS can be configured to monitor the PDCCH for M (M≤N) serving cells. In addition, the BS can be configured to preferentially monitor the PDCCH for L (L≤M≤N) serving cells.

Meanwhile, a technique which implements both carrier aggregation (CA) and cooperative multi-point (CoMP) is proposed. The CA is to support a plurality of cells by one BS, whereas the CoMP using the CA is to support a plurality of cells by a plurality of BSs.

Figure 3:
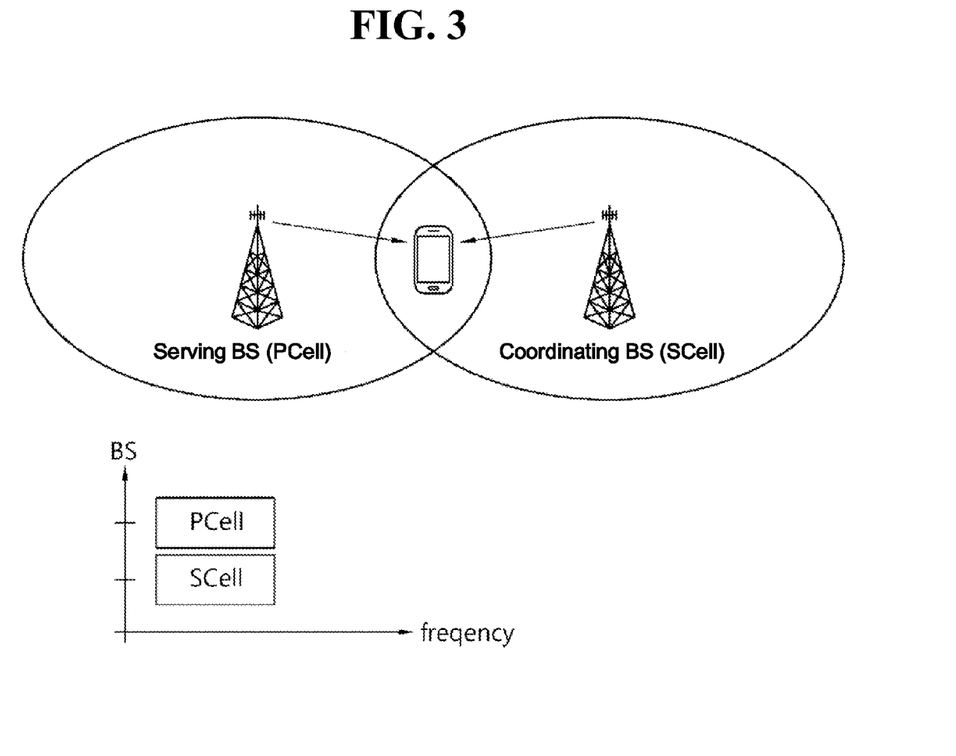
FIG. 3 shows an example of cooperative multi-point (CoMP) transmission using carrier aggregation (CA).

FIG. 3 shows an example of CoMP transmission using CA.

It is assumed that a serving BS corresponds to a primary cell, a coordinating BS corresponds to a secondary cell, and the primary cell and the secondary cell use the same regions in a frequency domain.

A cell which causes an interference to the primary cell may be allocated as the secondary cell, and then CoMP transmission may be implemented by using well-known various schemes such as joint transmission, dynamic point selection (DPS), coordinated beam forming, coordinated scheduling, etc.

Hereinafter, it is proposed a method for operating a CoMP operation in such a manner that, from a perspective of a wireless device, a plurality of cells participating in the CoMP operation is configured as if CA is applied to the cells.

For convenience of explanation, the following terminologies are defined.

CA set: It is a set of cells (to which CA is applied) which can be configured to the wireless device.

CA cell: It is a cell belonging to the CA set.

PCell: It is one cell among cells belonging to the CA set. More specifically, a cell to which an RRC connection is initially established by the wireless device may be designated as the PCell. The wireless device may receive a physical channel (e.g., PBCH) for obtaining important system information through the PCell. The wireless device may transmit a PUCCH through the PCell.

SCell: It is a cell which is not the PCell. It may be activated or inactivated by the PCell.

CoMP set: It is a set of cells to which a CoMP operation is applied among cells belonging to the CA set. It may include a cell participating in signaling or transmission/reception for CoMP or a cell which is a candidate for participating therein. The CoMP set may be identical to the CA set, or may be a subset of the CA set.

CoMP cell: It is a cell belonging to the CoMP set.

CoMP PCell: It is one cell among cells belonging to the CoMP set. A CoMP PCell may be identical to the PCell. Alternatively, in the CoMP PCell, RRC signaling may be configured separately from the PCell. The CoMP PCell may include a cell for transmitting a PDCCH which schedules PDSCH/PUSCH transmission for the CoMP cells.

CoMP SCell: It is a cell which is not a CoMP PCell among cells belonging to the CoMP set.

Hereinafter, although it is assumed a case where CoMP cells use an overlapping frequency band (or CC), it is also possible that the CoMP cells use different frequency bands.

Although one CoMP set and one CA set are described for example, the number of CoMP sets and the number of CA sets are for exemplary purposes only.

The CoMP set and/or the CA set may be a set of cells allocated to a wireless device by a BS. Information regarding the CoMP set and/or the CA set may be transmitted through RRC/MAC signaling by the BS to the wireless device.

The CoMP set may indicate a set of cells classified for a specific purpose also in cells belonging to the CA set.

The CoMP technique proposed hereinafter may be applied restrictively to a specific time duration (e.g., a subframe unit).

First, the proposed UL/DL scheduling will be described.

Figure 4:
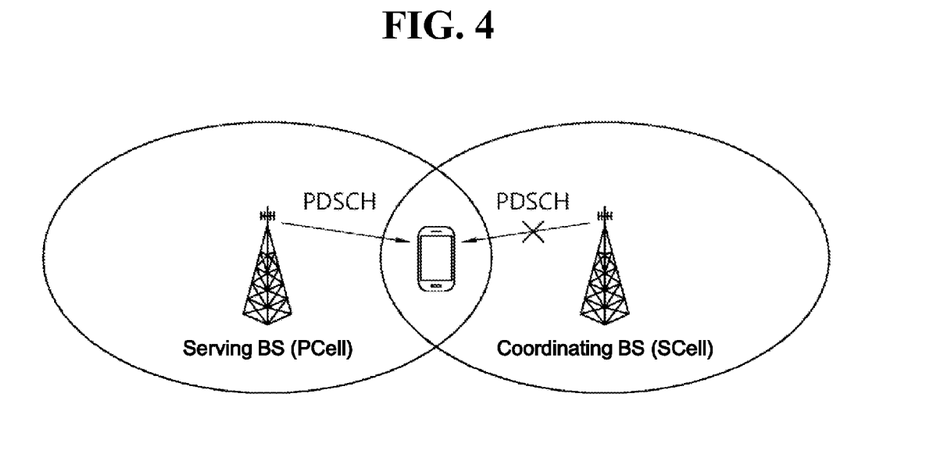
FIG. 4 shows a cooperative multi-point (CoMP) operation according to an embodiment of the present invention.

FIG. 4 shows a CoMP operation according to an embodiment of the present invention.

In the conventional CA operation, a DL channel (e.g., a PDSCH) may be transmitted through different CA cells in one time point (e.g., the same subframe) with respect to one wireless device. However, when it is applied to PDSCH transmission for a CoMP set with respect to one wireless device, if different CoMP cells transmit a PDSCH through an overlapping frequency band in the same time point, DL data reception capability may deteriorate due to interference. Therefore, the present invention proposes the following methods.

A serving BS and/or a coordinating BS may neither schedule nor transmit a PDSCH for two or more CoMP cells in the same subframe. The wireless device may not expect to receive a PDCCH for scheduling a PDSCH from the two or more CoMP cells in the same subframe, or may not perform monitoring.

If the wireless device receives a PDCCH for scheduling two PDSCHs with respect to two or more CoMP cells in the same subframe, PDSCH scheduling based on the PDCCH may be ignored. Alternatively, the wireless device may receive only selected PDSCH scheduling attempt, and may ignore the remaining PDSCH scheduling attempts. The selected PDSCH scheduling may include PDSCH scheduling for the CoMP PCell.

The wireless device may preferentially detect PDSCH scheduling for the CoMP PCell. Upon detecting the PDSCH scheduling for the CoMP PCell, the wireless device may not monitor the PDCCH for the PDSCH scheduling for the CoMP SCell.

PDSCH transmission which is not scheduled to a PDCCH (e.g., a PDSCH for semi-persistent scheduling (SPS), this is called as a PDSCH without a PDCCH) may be configured for one CoMP cell, and a PDSCH may be scheduled to another CoMP cell. The wireless device may discard PDSCH reception without a PDCCH, and may receive only a PDSCH scheduled to the PDCCH. Alternatively, the wireless device may preferentially receive the PDSCH without the PDCCH.

If a PDCCH for scheduling a PDSCH is detected for a CoMP cell to which the PDSCH without the PDCCH is assigned, the wireless device may discard transmission of the PDSCH without the PDCCH, and may receive the PDSCH scheduled to the detected PDCCH.

It may be configured such that only a CoMP PCell schedules a PDSCH of all CoMP cells. That is, it is a case where a PDCCH for DL scheduling is transmitted in the CoMP PCell. All CoMP cells may share the same search space (i.e., a UE specific search space or a common search space) for PDSCH scheduling and may monitor the PDCCH in the search space. In order to decrease the number of PDCCH blind detections, the sharing of the search space for a plurality of CoMP cells may apply only for a DCI having the same size. To share the search space, the cells may be configured to have the same transmission mode or the same bandwidth.

To share the search space, a bit may be added to the DCI for some or all of CoMP cells to have the same DCI size, or a unit amount of resource for scheduling a PDSCH or the total resource amount capable of scheduling the PDSCH may be regulated.

Although it is related to the DL scheduling, UL scheduling may also be performed in a similar manner.

In the conventional CA operation, a UL channel (e.g., a PUSCH) may be transmitted through different CA cells in one time point (e.g., the same subframe) with respect to one wireless device. However, when it is applied to PUSCH transmission for a CoMP set with respect to one wireless device, if different CoMP cells transmit a PUSCH through an overlapping frequency band in the same time point, UL data reception capability may deteriorate due to interference. Therefore, the present invention proposes the following methods.

A serving BS and/or a coordinating BS may neither schedule nor transmit a PUSCH for two or more CoMP cells in the same subframe. The wireless device may not expect to receive a PDCCH for scheduling a PUSCH from the two or more CoMP cells in the same subframe, or may not perform monitoring.

If the wireless device receives a PDCCH for scheduling two PUSCHs with respect to two or more CoMP cells in the same subframe, PDSCH scheduling based on the PUCCH may be ignored. Alternatively, the wireless device may receive only selected PUSCH scheduling attempt, and may ignore the remaining PDSCH scheduling attempts. The selected PDSCH scheduling may include PUSCH scheduling for the CoMP PCell.

The wireless device may preferentially detect PUSCH scheduling for the CoMP PCell. Upon detecting the PUSCH scheduling for the CoMP PCell, the wireless device may not monitor the PDCCH for the PUSCH scheduling for the CoMP SCell.

PUSCH transmission which is not scheduled to a PDCCH (e.g., a PUSCH for semi-persistent scheduling (SPS), this is called as a PUSCH without a PDCCH) may be configured for one CoMP cell, and a PUSCH may be scheduled to another CoMP cell. The wireless device may discard PUSCH reception without a PDCCH, and may receive only a PUSCH scheduled to the PDCCH. Alternatively, the wireless device may preferentially receive the PUSCH without the PDCCH.

If a PDCCH for scheduling a PUSCH is detected for a CoMP cell to which the PUSCH without the PDCCH is assigned, the wireless device may discard transmission of the PUSCH without the PDCCH, and may receive the PUSCH scheduled to the detected PDCCH.

It may be configured such that only a CoMP PCell schedules a PUSCH of all CoMP cells. That is, it is a case where a PDCCH for DL scheduling is transmitted in the CoMP PCell. All CoMP cells may share the same search space (i.e., a UE specific search space or a common search space) for PUSCH scheduling and may monitor the PDCCH in the search space. In order to decrease the number of PDCCH blind detections, the sharing of the search space for a plurality of CoMP cells may apply only for a DCI having the same size. To share the search space, the cells may be configured to have the same transmission mode or the same bandwidth.

To share the search space, a bit may be added to the DCI for some or all of CoMP cells to have the same DCI size, or a unit amount of resource for scheduling a PUSCH or the total resource amount capable of scheduling the PUSCH may be regulated.

In the existing 3GPP LTE, the PCFICH transmitted in a first OFDM symbol of the subframe carries a control format indicator (CFI) regarding the number of OFDM symbols (i.e., a size of the control region) used for transmission of control channels in the subframe. That is, the CFI indicates the size of the control region, the size of the data region, and a start point at which PDSCH transmission starts. A wireless device first receives the CFI on the PCFICH, and thereafter monitors the PDCCH.

When the PDCCH is transmitted only in the PCell, the wireless device acquires a CFI in every subframe through a PCFICH of the PCell. The CFI in the SCell may be given semi-statically not through the PCFICH but through RRC signaling.

Figure 5:
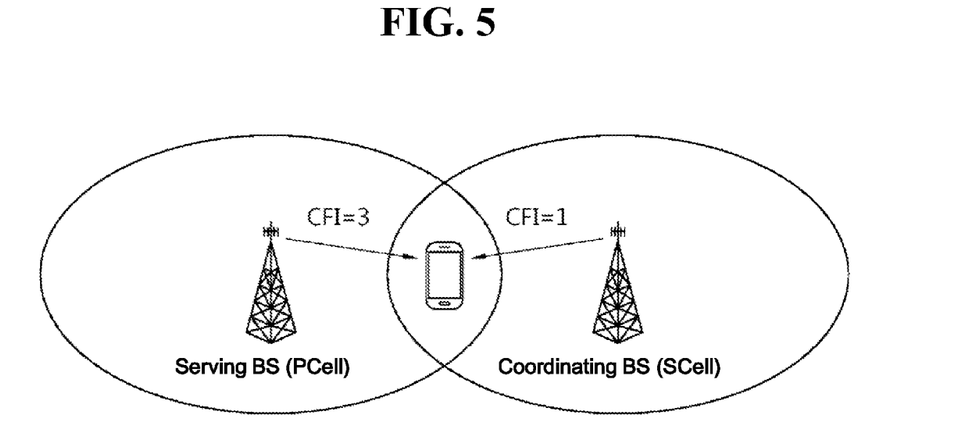
FIG. 5 shows an example in which a different control format indicator (CFI) is given to each cell.

FIG. 5 shows an example in which a different CFI is given to each cell.

However, when a plurality of cells within a CoMP set simultaneously transmit a PDSCH to one wireless device and the wireless device combines a plurality of PDSCHs by using joint coding for example, reception capability may deteriorate if a transmission start point of the PDSCH differs from one cell to another. Therefore, the start point of the PDSCH transmitted to one wireless device in the same subframe within the CoMP set needs to be adjusted identically. Therefore, the present invention proposes the following methods.

In a first embodiment, a CFI value in each subframe of cells in a CoMP set may depend on a CFI in a specific cell (e.g., CoMP PCell). The CFI of the specific cell may be transmitted to the wireless device through a PCFICH or extra signaling.

In a second embodiment, all of the cells within the CoMP set conform to a CFI determined through RRC/MAC signaling. Even if the CoMP PCell or the PCell exists in the CoMP set and their CFIs are designated, all of the cells in the CoMP set may conform to the CFI determined through RRC/MAC signaling.

A CoMP operation may apply differently according to a subframe. Assume that a subframe to which the CoMP operation is applied is called a CoMP subframe, and a subframe to which the CoMP operation is not applied is called a non-CoMP subframe. For example, a PDSCH to which the CoMP operation is applied may be transmitted in the CoMP subframe. Only the CoMP subframe may conform to the CFI determined through the RRC/MAC signaling. The RRC/MAC signaling may be applied independently for each CoMP set.

In a third embodiment, a common CFI may be transmitted through a PDCCH transmitted in each cell in the CoMP set. The common CFI refers to a CFI commonly applied to cells in the CoMP set. If a CFI having a different value is received from the cells in the CoMP set, the CFI may be ignored.

In a fourth embodiment, a CFI of each cell in a CoMP set is set to a maximum possible CFI value. The maximum CFI value may be given for each subframe.

In a fifth embodiment, a CFI of each cell in a CoMP set may be designated as a maximum value among CFI values acquired by a PCFICH transmitted from a cell in which a PDCCH in the CoMP set is received.

In a sixth embodiment, if a PDCCH for scheduling a plurality of CoMP cells in one CoMP cell is received in a specific subframe (or a specific duration), a CFI defined in one CoMP cell may be applied to the CoMP set.

As described above, when a PDSCH is transmitted only in one cell at one time point (or the same subframe) among cells belonging to a CoMP set, ACK/NACK for the PDSCH is not necessarily designed by considering all cells. Therefore, it is proposed to configure ACK/NACK information.

Hereinafter, it is assumed that a 1-bit ACK/NACK corresponds to one transport block (or codeword) transmitted on the PDSCH. This is for exemplary purposes only, and thus a plurality of transport blocks may be transmitted on the PDSCH in one cell, and the 1-bit ACK/NACK may be a value obtained by performing an AND operation on the plurality of transport blocks.

As to the cells in the CoMP set, the number of bits of an ACK/NACK payload transmitted in one subframe by the wireless device may be set according to ACK/NACK for one cell. As to cells not belonging to the CoMP set, ACK/NACK that can be transmitted to the maximum extent possible for each cell is set to the number of bits of the ACK/NACK payload. For example, if the CoMP set includes 3 cells and each cell transmits one transport block, the ACK/NACK payload transmitted in one subframe is defined as 1 bit. If the number of cells not belonging to the CoMP set is 3 and each cell transmits one transport block, the ACK/NACK payload transmitted in one subframe is defined as 3 bits. It can be generalized such that if a CA set has M cells and if N(M>N) cells belong to the same CoMP set, then the ACK/NACK payload is (M−N+1) bits.

If the maximum number of transmissible transport blocks differs for each cell belonging to the CoMP set, the number of bits of the ACK/NACK payload may be defined according to a cell having the maximum number of transport blocks. For example, if the maximum number of transport blocks of a first CoMP cell is 1 and the maximum number of transport blocks of a second CoMP cell is 2, the number of bits of the ACK/NACK payload is 2.

When ACK/NACK for the CoMP cell and ACK/NACK for a non-CoMP cell set are transmitted together, the ACK/NACK payload may be defined as follows.

In a first embodiment, CoMP cells may be configured to have consecutive cell indices so that ACK/NACK for the CoMP cell is a consecutive bit in the ACK/NACK payload. Therefore, the ACK/NACK bit for the CoMP cells and the ACK/NACK bit for the non-CoMP cell must not be mixed.

The cell index of the CoMP cell may be defined in an ascending or descending order of an index among cells belonging to the CA set. Alternatively, it is also possible to configure such that a PCell belongs to a CoMP set, a cell index of the PCell is set to 0, and cell indices of the remaining CoMP cells are allocated consecutively.

In a second embodiment, a position of ACK/NACK for a CoMP cell may be fixed within an ACK/NACK payload. For example, the ACK/NACK for the CoMP cell is configured as a least significant bit (LSB) or a most significant bit (MSB) in the ACK/NACK payload. Alternatively, the position of ACK/NACK for the CoMP cell may be a position next to ACK/NACK of a PCell in the ACK/NACK payload. If the PCell belongs to the CoMP set, the position of ACK/NACK for the CoMP set may be the position of ACK/NACK for the PCell. For example, if a cell index of the PCell is 0, ACK/NACK for the CoMP cell may be allocated starting from a first bit of the ACK/NACK payload.

In a third embodiment, the position of ACK/NACK for the CoMP cell may be set according to the position of ACK/NACK for a specific cell among cells belonging to the CoMP set. The specific cell may be a CoMP PCell or a cell having a greatest or smallest cell index among cells belonging to the CoMP set. Therefore, ACK/NACK for the CoMP set may be arranged according to the specific cell in the ACK/NACK payload for all CA sets.

An ACK/NACK payload including ACK/NACK for a plurality of cells may be transmitted through a PUCCH format 3 or a PUSCH. The ACK/NACK payload may be transmitted by being expressed or compressed with ACK/NACK channel selection, ACK/NACK bundling, channel coding, modulation, and a combination thereof.

When a wireless device supports a plurality of CA cells, if a PUSCH is scheduled in a subframe which transmits uplink control information (UCI) such as ACK/NACK, channel state information (CSI), etc., the UCI may be piggybacked on the PUSCH. The 'piggyback' is that the UCI is transmitted by being multiplexed to UL traffic to be transmitted on the PUSCH. When ACK/NACK for a plurality of cells is piggybacked on the PUSCH, the UCI may be piggybacked preferentially on a PCell.

When a PUSCH for a plurality of CoMP cells is transmitted in a subframe in which the wireless device transmits the UCI, the UCI may be piggybacked preferentially on the PUSCH transmitted through a CoMP PCell rather than a CoMP SCell. If the PCell does not belong to the CoMP set but there is PUSCH transmission through the PCell, the wireless device may piggyback the UCI on the PUSCH transmitted to the PCell, or may piggyback the UCI through the PUSCH transmitted to the CoMP PCell irrespective of PUSCH transmission of the PCell.

When the wireless device supports a plurality of CA cells and feeds back CSI for the plurality of CA cells, CSI for one or some CA cells may be selectively transmitted, and CSI feedback for the remaining CA cells may be discarded. In this case, the CSI for the PCell may be transmitted preferentially over other cells.

It is proposed to preferentially transmit the CSI for the CoMP PCell rather than the CSI of the CoMP SCell when the wireless device transmits the CSI for the plurality of CoMP cells. CSI transmission for the CoMP SCell may be discarded preferentially over CSI transmission for the CoMP PCell. For a priority for the CoMP PCell, a different reference (e.g., CSI content, period, etc., of each CoMP cell) may be first applied, and then may be applied as a next step after selecting a cell for discarding CSI transmission.

The CSI for the CoMP PCell may be transmitted preferentially over an SCell not belonging to the CoMP set or all cells not belonging to the CoMP set.

In order to implement CSI prioritization for the CoMP set, the CoMP PCell within the CoMP set may be assigned a smaller cell index than the CoMP SCell. For example, a smallest cell index may be assigned to the CoMP PCell, and then a priority may be assigned according to a cell index.

UL transmission timing for each of a plurality of CA cells of the wireless device may be regulated independently for each timing advance grout (TAG). The plurality of CA cells belonging to one TAG may share the same UL transmission timing. The same timing advance command (TAC) is applied to cells belonging to the same TAG, and such cells share a time alignment timer.

For a CoMP operation, when UL transmission is constant irrespective of a target cell, an implementation can be simply achieved from a perspective of BS reception or UE transmission. Therefore, cells in the same CoMP set may belong to the same TAG. That is, cells in the same CoMP set may share the same UL transmission timing.

To regulate UL transmission timing, a random access procedure may be performed. A random access preamble may be transmitted through a CoMP PCell. In addition, the wireless device may receive a PDCCH for triggering transmission of the random access preamble in the CoMP PCell.

UL transmission timing may be regulated by using the random access procedure only for the CoMP PCell, and the CoMP SCell may determine UL transmission timing by using a TAC in the CoMP PCell.

As described above, when a plurality of cells belonging to a CoMP set simultaneously transmit a UL channel (e.g., PUSCH, PUCCH, SRS) in one subframe, successful reception of a BS may be difficult due to interference. Therefore, UL channel transmission is proposed as follows. Hereinafter, when it is said that SRS/PUSCH/PUCCH is transmitted in a CoMP cell, it may imply that SRS/PUSCH/PUCCH is transmitted according to parameters configured in the cell.

The wireless device may transmit the SRS only in the selected CoMP cell in one subframe among CoMP cells included in the CoMP set. In SRS transmission, the CoMP PCell may have a higher priority than the CoMP SCell. The SRS transmission may not be allowed in the CA cell not belonging to the CoMP set.

When the wireless device transmits the SRS in one CoMP cell included in the CoMP set, the PUSCH or PUCCH of the remaining CoMP cell may not be transmitted in an OFDM symbol in which the SRS is transmitted or may discard PUSCH/PUCCH transmission. SRS/PUSCH/PUCCH transmission may be allowed in the CA cell not belonging to the CoMP set.

Figure 6:
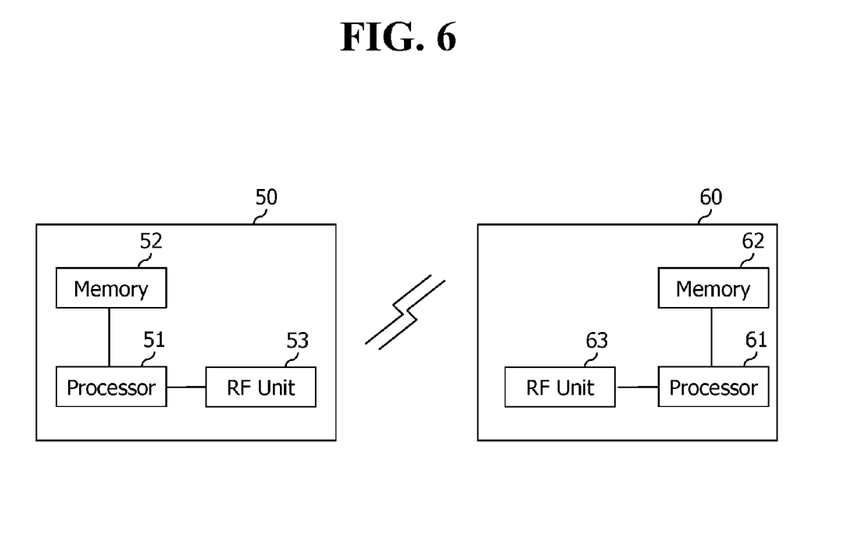
FIG. 6 is a block diagram of a wireless communication system according to an embodiment of the present invention.

FIG. 6 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A communication method for cooperative multi-point (CoMP) in a wireless communication system, the method comprising:
receiving a first physical downlink control channel (PDCCH) including first scheduling information on a first physical downlink shared channel (PDSCH) to be received in a first subframe of a first frequency band from a first CoMP cell;
receiving a second PDCCH including second scheduling information on a second PDSCH to be received in a second subframe of a second frequency band in a second CoMP cell, wherein the first frequency band overlaps partially or entirely with the second frequency band; and
if a first start point at which the first PDSCH in the first subframe starts is to be received is the same as a second start point at which the second PDSCH in the second subframe starts is to be received, selecting the valid one of the first scheduling information and the second scheduling information thereby ignoring the other one of the first scheduling information and the second scheduling information.

2. The method of claim 1, wherein the first and second subframes include a plurality of orthogonal frequency division multiplexing (OFDM) symbols.

3. The method of claim 2, wherein the first and second start points correspond to any one of 2nd through 7th OFDM symbols.

4. The method of claim 1, wherein the first and second start points are indicated by one control format indicator (CFI).

5. The method of claim 4, wherein the single CFI is received in one of the first and second CoMP cells.

6. The method of claim 5, wherein the single cell is a primary cell.

7. A wireless device for supporting cooperative multi-point (CoMP) in a wireless communication system, the wireless device comprising:
a radio frequency (RF) unit configured to transmit and receive a radio signal; and
a processor operatively coupled to the RF unit, the processor being configured to:
receive a first physical downlink control channel (PDCCH) including first scheduling information on a first physical downlink shared channel (PDSCH) to be received in a first subframe of a first frequency band from a first CoMP cell, receive a second PDCC including second scheduling information on a second PDSCH to be received in a second subframe of a second frequency band in a second CoMP cell, wherein the first frequency band overlaps partially or entirely with the second frequency band, and if a first start point at which the first PDSCH in the first subframe starts is to be received is the same as a second start point at which the second PDSCH in the second subframe starts is to be received, select the valid one of the first scheduling information and the second scheduling information thereby ignoring the other one of the first scheduling information and the second scheduling information.

8. The wireless device of claim 7, wherein the first and second subframes include a plurality of orthogonal frequency division multiplexing (OFDM) symbols.

9. The wireless device of claim 8, wherein the first and second start points correspond to any one of 2nd through 7th OFDM.

10. The wireless device of claim 7, wherein the first and second start points are indicated by one control format indicator (CFI).

* * * * *